Patented Jan. 26, 1943

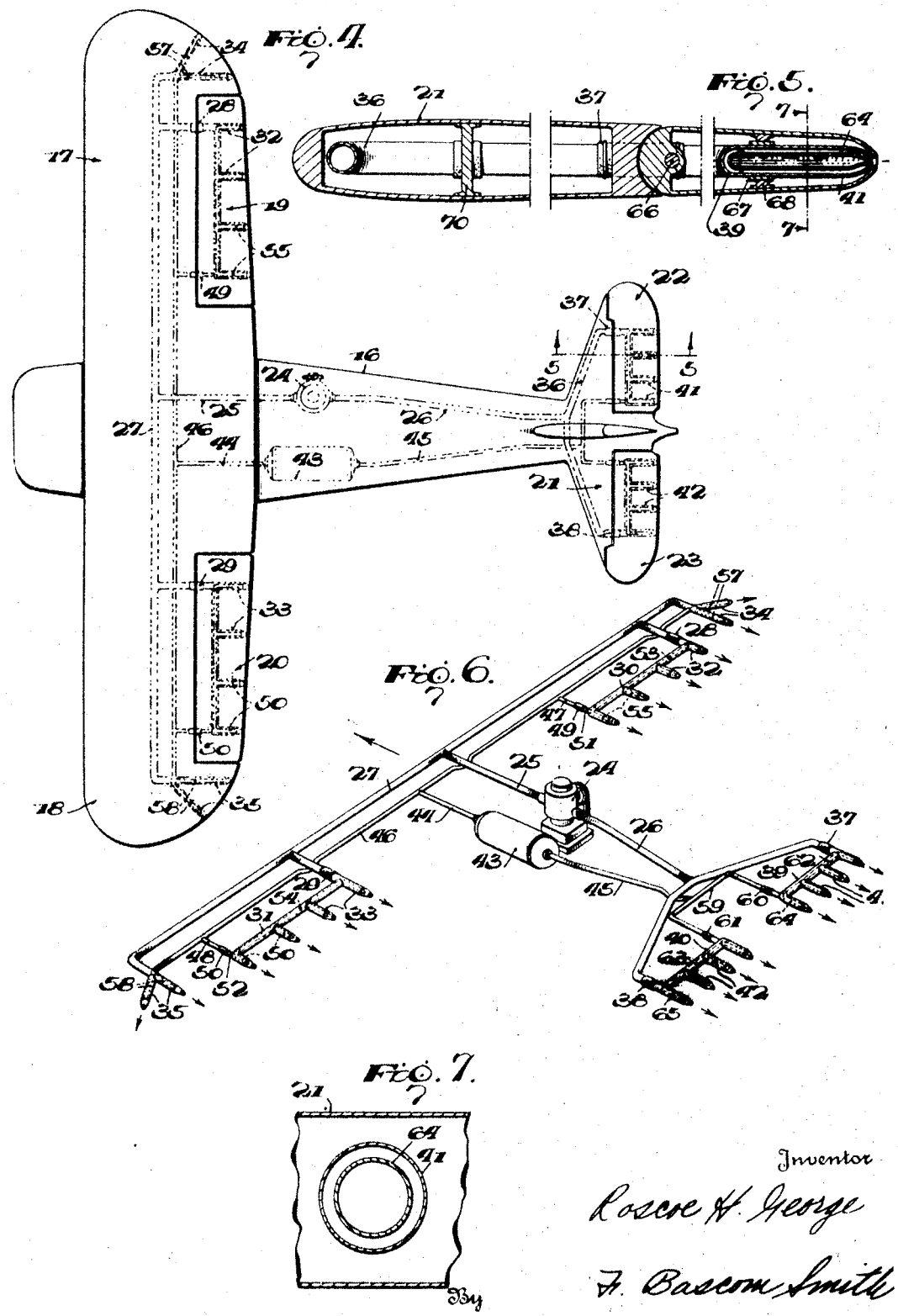

2,309,584

UNITED STATES PATENT OFFICE 2,309,584

STATIC ELIMINATION

Roscoe H. George, West Lafayette, Ind., assignor to Purdue Research Foundation, West Lafayette, Ind., a corporation of Indiana Application February 23, 1938, Serial No. 191,945

14 Claims. (Cl. 244—1)

This invention relates to the subject of radio reception and more particularly to the elimination of a particular interference therewith, commonly termed "snow static."

It is well known that in high speed mobile bodies, such as aircraft, and principally in all-metal aircraft, radio reception is rendered unintelligible under certain atmospheric conditions such as snow, rain, hail and dust storms. It has been determined that the atmosphere surrounding the earth has a definite electrical potential with respect thereto and hence a vast storage space for electrical charges exists about the earth. It has been estimated that near the surface of the earth the potential varies about thirty-five volts per foot of altitude. As the altitude increases, the volts per foot of height become less and at about twenty thousand feet, it is estimated that the potential distribution is fifteen volts per foot. Particles, such as snow, ice, rain and dust, falling through the atmosphere, or being propelled about, assume a definite charge and an aircraft flying through these particles will accumulate charges from the particles with which it comes into contact, and when a craft flies through dry snow or dust, the friction of the particles against the surfaces generates static charges on the craft. When such a charge builds up to a sufficiently high potential, severe static interference is experienced in radio reception. This static interference is commonly called snow static and forms one of the principal hazards of scheduled flight. One of the attendant difficulties with reception during such storms is the "frying" sound which is apparent in the earphones of a receiver after a short interval of flying through the atmospheric conditions set forth above. After a craft has flown through these conditions for a certain interval, so that corona discharge begins to occur at different points of the aircraft, the frying sound is augmented by the occurrence of static pulses at regular intervals which take on an audible tone, the pitch of which depends on the intensity of the discharge. As the discharge intensity varies rapidly, and as a number of points on the aircraft go into corona discharge simultaneously, each with its own audible tone, the sound takes on a whining character and has been called "crying static" by pilots who have experienced this type of interference. Because of the existence of snow static, the pilot's ability to hear radio signals is lessened to a great extent and in the vast majority of instances the signal is completely blocked out. As snow static interference is usually experienced only during conditions of low visibility, the loss of radio range signals, weather broadcasts, and information concerning availability of landing fields, deprives the pilot of his principal aids to blind flying.

Early observations on the subject of snow static indicated that the interference was caused by the impinging of charged water, snow, ice, dust and other particles upon the antenna of an aircraft radio receiver. As set forth above, however, it is the accumulation of the minute charges over the whole surface of the aircraft, which charges, in a short interval, build up to such a high potential that a point at which certain portions of the aircraft will go into corona discharge is reached. It has been proven experimentally that upon reaching the corona point, the characteristic snow static crackling or "frying" is heard, along with one or more annoying audio frequency tones, and the volume of the crackling and also the audible tone will vary with the potential of the craft with respect to the surrounding atmosphere and also with the rate of corona discharge. Since most high speed aircraft, and principally transports, are of all-metal surface construction, the charges are readily conducted to sharp projecting points or rounded points of smaller radius, such as the tips and trailing edges of wing and tail surfaces, which points discharge into the atmosphere at lower potentials than smooth portions of large diameter, such as the fuselage and the edges of wing and tail surfaces. Routine observations made by military pilots and pilots of commercial airlines, as well as statistics compiled experimentally, show that under conditions of snow static interference, the wing and propeller tips of the aircraft very readily show a corona glow or visible discharge and under these conditions the static in the receiver completely masks all signals.

It is well known that the resistance of an electrical arc and an electrical spark in air, at atmospheric pressure, decrease with increase in current, i. e., the arc has a negative resistance characteristic. This characteristic is true of the phenomenon known as corona discharge and the minute streamers or spark nuclei of the corona discharge obey this resistance law of the arc. This condition, together with the effect of space charge, tends to produce an unstable discharge such that the current builds up until its path is blocked by the accumulated space charge. As the current of the arc or corona discharge dies out the resistance of its path increases very rapidly and the current flow stops until the space charge is carried away and then the cycle of building up and dying down to the point of stopping is repeated. Since the currents in these pulses build up very rapidly, causing equally rapid changes in the disposition of charge, the effect on the antenna is analogous to the striking of a tuning fork a sharp blow with a very light hammer, causing it to dissipate the energy received from the impact by vibrating it at its resonant frequency. It is the envelope of these wave trains which comes through the antenna and receiving detector and excites the audio amplifier, giving rise to the static disturbances in the receiver.

Due to the necessity of commercial airlines for maintaining regular schedules, in recent years craft have been required to fly more frequently at times when snow static interference is at its worst, and many of the aircraft fatalities have been attributed by authorities to the failure of radio reception under extreme conditions of snow static.

One of the objects of this invention is to provide novel means for eliminating interference with reception due to the effects of atmospheric static, as outlined above.

Another object of the invention is to provide novel apparatus for dissipating static charges from mobile craft carrying radio receivers, so that reception may be facilitated.

Other objects lie in the use of a novel method of maintaining a metal vehicle, particularly an aircraft, at a low potential with respect to its surrounding medium and in the provision of novel means whereby the high electrical charges acquired by the craft which ordinarily cause static interference may be discharged in such a manner as to allow unimpeded reception of radio signals.

The above and other advantages of the novel invention disclosed herein will appear more fully in the detailed description of the invention which is to be taken in conjunction with the accompanying drawings illustrative of certain embodiments of the invention. It is understood, however, that the drawings are for the purpose of illustration only and are not designed as a definition of the limits of the invention, reference being had primarily for this purpose to the appended claims.

In the drawings, wherein like reference characters refer to like parts, throughout the several views, Fig. 1 is a side elevational view of the empennage of an aeroplane showing one embodiment of the invention thereon;

Fig. 4 is a plan view of an aeroplane showing another embodiment of the invention diagrammatically represented therein;

Fig. 5 is a cross-sectional view in elevation, along the line 5—5 of Fig. 4.

Fig. 6 is a representation in perspective of the embodiment of the invention shown diagrammatically in Fig. 4; and, Fig. 7 is an enlarged sectional view taken along the line 7—7 of Fig. 5.

Generally speaking, the present invention comprises the combination with a mobile body, such as an aircraft subject to high electrostatic charge, of novel means for dissipating this charge and for maintaining said body at a comparatively low electric potential, whereby the effects of high static charge on ratio reception in said body are minimized. Novel means are provided which not only eliminate the high static charge, but means are also provided for discharging the mobile body in such a manner and at such a rate that uninterrupted radio reception is effected under atmospheric conditions which formerly made radio reception either impossible or extremely difficult.

Figure 1:
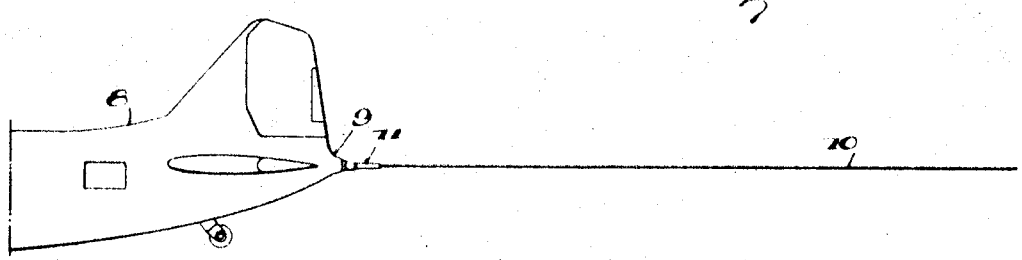

Referring now to the novel embodiment of the invention shown in Fig. 1, the empennage of a conventional aircraft 8, preferably of all metal surface design, is shown, having attached to the extreme tail portion 9 a long conductor 10, connected to the tail portion through the medium of a ferrule 11, of smooth exterior configuration, containing an electrical resistor which is connected in electrical series relation between the tail 9 of the craft and the forward end of conductor 10. Conductor 10 may be of any suitable length; for example, 20 feet, and is preferably on the order of three-thousandths of an inch in diameter. With a wire of this gauge, the resistor in ferrule 11 can be about one megohm, although values up to several megohms have proved suitable.

When the aircraft becomes charged to a high static potential, current will flow toward the rear of craft 8 to the extremity 9 thereof and thence through the electric resistor in ferrule 11, along conductor 10, which being of very fine gauge is conducive to corona discharge at a voltage considerably lower than any portion of the aircraft. As portions of the charge are dissipated into the surrounding atmosphere, oscillatory currents are set up and would, unless otherwise prohibited, surge back and forth along conductor 10 and through the metal body of the aircraft, but by provision of the resistance 11 of fairly high value, steep wave front currents are damped out. With the novel embodiment shown in Fig. 1, the discharge of the craft is restricted to an area to the rear thereof and radio reception can be carried on without interference under mild snow static conditions.

The resistor in ferrule 11 should be of such value as to counteract the negative resistance characteristic of the corona discharge and thus cause the current flow therethrough to be more uniform. In order to effect this purpose, it is therefore desirable to reduce the capacitance of the conductor beyond the resistance to a minimum. This condition should be satisfied also for the trailing discharge wire shown in Figures 2 and 3.

It has been found, by actual flight tests carried on over an extended period of time, that radio reception can be achieved through extreme conditions of snow static, if the static can be discharged at a point remote from the craft. In the novel embodiment of the invention shown in Fig. 2, the tail portion 9 of the aircraft 8 has attached thereto a resistor-containing ferrule 11 of construction similar to that shown in Fig. 1, the resistor of which is in series connected to a conductor 12 at the forward extremity thereof, and a second conductor 13 of comparatively fine gauge is electrically connected thereto in series relation by a second electric resistor in ferrule 14. Conductor 12 is preferably of larger diameter than conductor 13 in order that the point at which corona discharge occurs will be lower for conductor 13 than for conductor 12, which latter is preferably covered with insulating material such as a rubber composition, in order to further raise the point at which this conductor will go into corona discharge. When the craft flies through a region of snow static, a charge will, as above set forth, flow to the extremity of tail portion 9 through the resistor in ferrule 11, along the conductor attached thereto. In the novel embodiment of the invention shown in Fig. 2, however, the charge is not discharged into the atmosphere at this point but is conducted through the resistor in ferrule 14 to wire 13, which is preferably bare and from which the electric charge can be dissipated in corona. Resistors in ferrules 11 and 14 act to suppress steep wave front currents. Suppression of these steep wave front currents and the resulting reflections is important since they cause serious radio disturbances.

Figure 2:
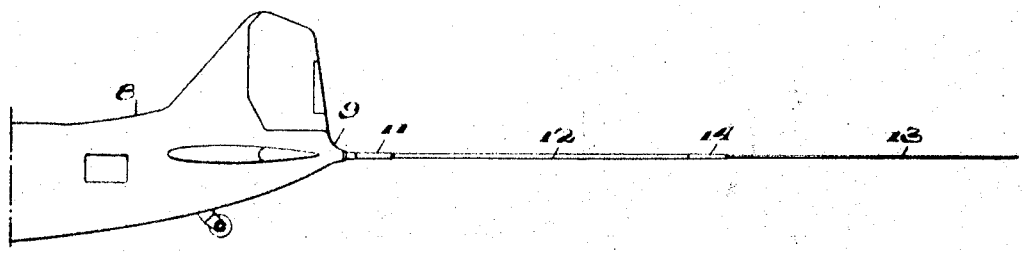
Fig. 2 is a similar view showing a second embodiment of the present invention.
Figure 3:
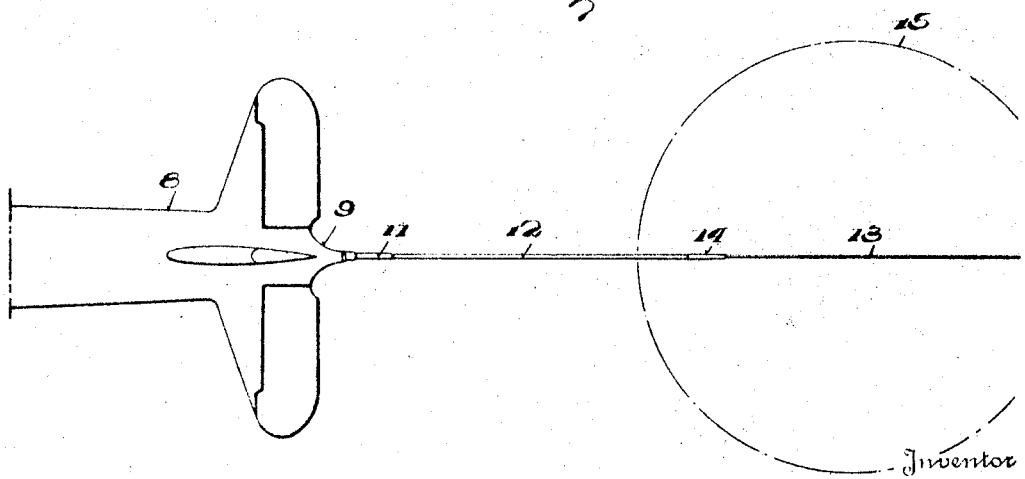
Fig. 3 is a plan view of the structure shown in Fig. 2.

When this novel embodiment of the invention is used, the area in which the disturbance due to discharge from conductor 13, which is most prominent and most disruptive of radio reception and which can be called the "noise field," is located remote from the craft as can be seen from the circle 15, which represents this area in Fig. 3. If a receiver were to be positioned within the area represented by this circle, the snow static would completely block out all reception just as reception is blocked out at the present time, without the use of the present invention, due to the various portions of the craft going into corona discharge. By a suitable selection of length and diameter for conductor 12 and by providing the same with a covering of insulation such as rubber composition or the like, all static discharge can be restricted to the conductor 13, which, being bare and of fine gauge, affords a surface of low resistance to corona discharge. When an aircraft equipped with the embodiment of the invention shown in Figs. 2 and 3 is flying through a region of extremely bad snow static, the charge will be led not only from the body of the craft through the tail extremity 9, without going into corona, but it will also be led along the conductor 12 without discharge, to a point situated so far from the body of the craft that the effects of the discharge do not interfere with radio reception.

In the embodiments described above, electric conducting wires and resistors have been employed to effect the novel results obtained by use of the invention, but in Fig. 4, there is shown a diagrammatic representation of a system wherein a jet conductor may be made to effect the same advantageous results. There is shown an aircraft body designated generally as 16, having wing portions 17 and 18 containing ailerons, flaps, or other movable control surfaces 19 and 20 and a tail portion 21 having movable elevator control surfaces 22 and 23. By dotted lines, and full lines in Fig. 6, there is shown another novel embodiment of the invention which comprises a pump member 24, having conduits 25 and 26, connected to output ports thereof for supplying pneumatic pressure within these conduits, the former of which, 25, connects to a cross-conduit 27, which leads through flexible connectors 28 and 29 and manifold members 30 and 31, respectively, to pluralities of nozzle-like extremities 32, 33, and 34, 35, in wing portions 17 and 18, respectively. Conduit 26 connects to a cross-conduit 36 in tail surface 21 of the body 16, which cross-conduit leads through flexible connectors 37 and 38 and manifolds 39 and 40 to another series of nozzle-like extremities 41 and 42 in elevator surfaces 22 and 23, respectively. By means of pump 24, air or other fluid pressure is forced through conduits 25, 26, 27 and 36 and ejected from the rearwardly extending nozzles 32, 33, 34, 35, 41 and 42.

A second system of conduits, through which water or any other conducting or semi-conducting fluid is to be passed, comprises a reservoir 43 having outlets connected to conduits 44 and 45, the former of which connects to a cross-conduit 46, which leads to wing sections 17 and 18, respectively and by means of branches 47 and 48 and flexible connections 49 and 50, to control surfaces 19 and 20 in wing sections 17 and 18, respectively. The points 51 and 52 in this system of conduits designate the input to manifolds 53 and 54, which are shown as dotted lines within the manifolds 30 and 31. Manifolds 53 and 54 are of less diameter and, positioned concentrically with respect to manifolds 30, 31 and have a plurality of nozzle-like extremities 55 and 56 within the nozzle-like extremities 32 and 33, above mentioned. Cross-conduit 46 has additional nozzle-like extremities 57 and 58 in the tips of wing sections 17 and 18, respectively. Conduit 45 connects with a cross-conduit 59 in tail portion 21 and through flexible connectors 60 and 61 to manifolds 62 and 63 within elevator control surfaces 22 and 23, respectively. These latter manifolds, having nozzle-like extremities 64 and 65, are similar to those described in conjunction with the wing sections and are mounted within the manifolds 39 and 40, in the manner above described. It will be noticed that all the nozzle-like extremities shown project rearwardly of the craft, as indicated by the small black arrows in Fig. 6.

A detailed cross-sectional view of the interfitting nozzle-like projections is shown in Fig. 5, wherein 21 indicates generally the tail surface of the aircraft body 16 and 22 represents the elevator control surface which is pivotally connected to metal tail surface 21 by a hinged arrangement indicated generally at 66. Cross-conduit 36 is shown within the tail assembly 21, connected through the flexible tubing 37 with manifold 39, from which one of the nozzle-like extremities 41 is shown extending. The orifice, or open end of nozzle 41 is shown to be in contact with the metal skin or surface of elevator 22 and supported in this position by any suitable means, such as a shock-proofing resilient collar 67 which extends through an aperture in the spar member 68 to snugly engage member 41. Likewise, conduit 36 is mounted in tail surface 21 by a suitable resilient collar 69 which is fitted into an aperture in the spar 70. Nozzle-like member 64 is supported within member 41 by suitable means, which have not been shown, since it is thought that the inclusion of such means would only render the drawing confusing. It will thus be seen that the series of nozzle-like tubes 41 and 64 are arranged concentrically with respect to each other. This is clearly illustrated in the enlarged cross-sectional detail view in Fig. 7 as well as in Fig. 5. The open ends or orifices of the tubes 41 and 64 are reduced into nozzle-like throats whereby the flow of air through tube 41 will cause liquid to be drawn from tube 64 in atomized form, and be projected rearwardly of the aircraft. While Fig. 5 is referred to as being a cross-section through the tail assembly, the same arrangement of nozzle-like tube projections is to be found in the wing and aileron installations of this form of the invention, and for this reason, a cross-sectional view thereof is deemed unnecessary.

The novel embodiment of the invention just described operates as follows:

Pump 24 forces air under pressure through conduit 25 and thence by way of cross-conduit 27 to the atmosphere, by way of the series of nozzles 34 and 35 and also through manifolds 30 and 31. Likewise, pump 24 also forces air through conduit 26, cross-conduit 36 and thence to the atmosphere through the series of nozzle-like projections 41 and 42 in the elevator control surfaces 22 and 23. As will be readily understood, the flow of air through these nozzles will cause the pressure at the orifice of the smaller nozzles, such as 64, in Fig. 5, to be reduced and liquid will therefore be drawn from reservoir 43 through conduits 44 and 45 to surrounding atmosphere through the series of nozzles 55, 56, 57, 58, 64 and 65. As has been stated above, the liquid should be of conducting or semi-conducting substance, such as water, and in passing through the orifices of the nozzles, electrical charges accumulating on the wings 17 and 18, control surfaces 19, 20, 22 and 23 in the region of these nozzles, will be assumed by the small atomized particles of liquid and carried from the craft. In aeroplanes of all-metal construction, when the charges located at the trailing portion of the wing and elevators have been reduced, additional charges will be readily conducted to the region of these orifices and will be assumed by the liquid and in turn atomized and discharged into the atmosphere. It has been found that with only a few pounds of pressure above atmospheric, electrical charges can be dissipated at a satisfactory rate of speed and that the charges so dissipated cannot return to the craft because of the resistance of the finely divided liquid jets formed by the atomized means herein disclosed. Each particle of liquid which is projected into the atmosphere will assume a portion of the charge of the aircraft's surface and for a given volume of liquid, the greatest rate of discharge will occur when the liquid is most finely atomized. Thus, the rate of discharge can be controlled over wide limits to meet the needs of both mild and extreme static conditions.

It will be noticed that the nozzles in ailerons 19 and 20 are positioned sufficiently away from the body of the aircraft to allow the jets of liquid to be atomized into the atmosphere without impinging upon any portion of the craft. In this manner, no part of the charge dissipated through the nozzle can be returned to the craft. The column or jet of liquid acts not only to carry off portions of the static charge but prevents the return of this charge to the craft because of the inherent resistance of the finely divided column of liquid. By regulating the pressure of the pump 24, the resistance of this column of liquid can be accurately controlled to meet the needs of various degrees of snow static.

From the above description, it will appear that a novel system for the elimination of charges from mobile bodies such as aircraft, has been provided. While the invention has been described principally with reference to all-metal aircraft, it can be utilized on aircraft of partly metal surfaces. The use on all-metal aircraft has been stressed, however, due to the prevalence of this type of craft in commercial transportation. The resistors described with reference to Figs. 1, 2 and 3 may have different values depending upon the size of the craft and the rate of discharge permissible for different conditions of snow static. Further, while the length of conductor 10 in Fig. 1 has been stated as being on the order of twenty feet, this last may be decreased somewhat without losing the beneficial results of the invention. Further, conductor 10, 12 and 13 might be increased to any lengths and experimentation with different types of craft and different values of resistors will indicate the optimum lengths as well as the most desirable diameters for the conductors.

Elements 11 and 14 have been described as ferrules and this term has been used to denote electrical resistor housings in general, but any suitable means for interposing resistors between the body of the craft and between conductors will, of course, be acceptable. For example, elements 11 and 14 might be molded insulating tubes or tubes of rubber composition with suitable connecting means thereon for attaching to the body of the aircraft and to conductors 10, 12, and 13. Conductor 12 has been described as being of large diameter and preferably insulated. It is understood, of course, that the greater the diameter of the conductor the higher the conductor can be charged before it goes into corona discharge. This conductor might be either a solid wire or a flexible tube of any of the well known constructions.

The several conduits, such as 25, 26, 27, 33, 37, 38, 39 and 52 shown in Figures 4 to 6, may be of any desired material but are preferable of non-conducting material, such as glass, of one of the several cellulose substitutes for glass, or tubing of the many artificial resins on the market. Likewise, the nozzle-like extremities and manifolds shown in these figures might be of any material but are preferably made of insulating material such as listed above. Insulating material is highly advantageous since the potential gradient at the end of the column or jet of liquid will be much higher than if the nozzles were made of conducting material.

It has been stated that the liquid used in the last embodiment of the applicant's invention should be conducting or semi-conducting, but it is to be understood that a non-conducting liquid, or a finely divided powder such as aluminum might be employed. Because of the greater ease, however, with which conducting liquids or powders will assume portions of the charge from the metal surface of the aircraft, conducting substances are to be preferred. It is understood, of course, that "conductor," unless otherwise indicated, is meant to include both liquids and solids. Common water has proved to be sufficiently conductive to assume charges at a satisfactory rate for efficient operation of the invention.

While in Figs. 1 to 3, conductors are shown attached to the extreme tail portion 9 of the aircraft, it is to be understood that a plurality of conductors might be attached along the trailing portion of the elevator surfaces and wings. In the event that wires are placed along the trailing portion of the wings, it is necessary only that they be of sufficient length that the discharge into the atmosphere will not occur in a region relatively close to the body of the craft. By extending the fine discharger wire some distance from the aircraft, the potential gradient along the wire is increased, thus permitting the discharge to take place at a lower voltage. It has been found that where the aircraft receiver employs a loop antenna the static disturbance varies approximately inversely as the square of the distance of the wire from the antenna, and where the receiver employs the usual form of open wire antenna, the disturbance varies approximately inversely as the cube of the distance from the discharger wire to the antenna. The desirability, therefore, of placing the discharger wire a good distance from the antenna is therefore readily seen.

It is understood that in order to minimize whipping of the discharger wire in flight, a wind cone or other steadying device well known in the art might be attached to the free end thereof.

The invention has been described with particular reference to aircraft, but it should be understood that the invention is equally applicable to all mobile craft, such as ships and automobiles. A radio receiver in any body having a large surface, particularly a large metal surface extent, will be affected by snow static interference if discharged particles, as above described, impinge upon it with appreciable velocity. Snow static effects have been observed frequently on shipboard and the present invention can be used advantageously to prevent radio interference with reception in ships or in any type of mobile body.

Further, snow static interference has been experienced in many ground radio receiving stations during rain, snow and dust storms when, due to high wind velocity, charged particles impinging upon the antenna and antenna supporting structure have caused the same to go into corona discharge. Whereas the particles impinging upon the aircraft antenna in flight form only a small portion of the total static disturbance in a radio receiver carried by the aircraft, under snow static conditions a ground station antenna with a high wind blowing broadside thereof, has an enormous number of charged particles impinge thereon and raise the voltage of the antenna and also of the antenna supporting members to the point of corona discharge. It will be readily seen that the present invention can be adaped to maintain ground station structures at a low static potential and to dissipate charge thereof at an appreciable distance from the structure.

The conductors used in the embodiments of the invention disclosed in Figures 1 to 3 have been described as wires, however, conductors of distributed resistance can be substituted for these wire conductors. For example, it has been found that a length of rope impregnated with graphite throughout its length can be substituted for conductor 12 in Figures 2 and 3 or for conductor 10 in Figure 1. As other equivalents will suggest themselves to those skilled in the art, it is therefore not intended to limit the invention to the use of the particular types of conductors named.

While only a few embodiments of the invention have been illustrated and described herein, it will be understood that various changes will occur to those skilled in the art. The invention is not to be limited by the drawings and specification but by the scope of the appended claims.

What is claimed is:

1. In combination, a body subject to high electric charges, means for dissipating said charges, said means comprising a plurality of resistors and a plurality of conductors, the first of said resistors being electrically conected at one end to an extremity of said body, and electrically connected at the other end to one of said conductors, a second resistor electrically connected to the other end of said conductor, a second conductor electrically connected to the other end of said second resistor, the first mentioned conductor being of a large diameter and covered with insulating material and the second conductor being of relatively small diameter.

2. Means for discharging a vehicle subject to high static charge, which comprises an electrical resistance of constant value having one end connected to said vehicle and a conductor connected to the end of said resistance, said conductor extending to a point remote from said vehicle and having a lower resistance value than said resistance.

3. Apparatus for the elimination of snow static interference with radio reception on a vehicle moving at high speed, comprising an electric resistor of constant value connected to a trailing portion of said vehicle and a conductor of lower resistance value than said resistor connected in series to said electric resistor, whereby electric charges may be dissipated through said conductor in a region remote from said vehicle.

4. Apparatus for the prevention of snow static interference with a radio receiver carried by a vehicle moving at a high velocity, comprising a pair of wires and a resistance element of constant value, one of said wires being electrically connected to the rear extremity of said vehicle and said resistance element connecting the other end of said wire to one end of the other wire.

5. In combination with an all-metal aircraft, means for eliminating the interference due to snow static in a receiver, comprising a resistor electrically connected to an extremity of said aircraft, a conductor electrically connected to said resistor, a second resistor connected to said conductor and a second conductor electrically connected to said second resistor, the first mentioned conductor being of relatively large diameter and said resistors being of such a value that charges may not be imposed upon said aircraft through the medium of said conductors.

6. In combination with an all-metal aircraft subject to high static charges, means comprising a resistor connected to a trailing portion of said craft, an electric conductor in series with said resistor, said electrical conductor having insulating material thereon and a second electrical conductor connected to said first conductor and being of smaller diameter and greater electrical resistance than said first conductor.

7. In combination, a body subject to snow static interference with radio reception, means for eliminating the effects of said interference, said means comprising a plurality of trailing wires of different cross-sectional diameters, said wires being electrically connected to each other and to said body through resistors.

8. In combination with a trailing portion of an all-metal vehicle subject to high static charge, means for dissipating portions of said charge, comprising a plurality of conductors of different cross sectional diameters connected in series to said trailing portion and an electrical resistance interposed between said conductors.

9. In combination with an aircraft, means for eliminating static charges which collect on the surface thereof, said means comprising a member extending substantially parallel to the longitudinal axis of the aircraft and rearwardly of said aircraft during flight, the diameter of the member being extremely small as compared to the length thereof, and an electric impedance element, interposed between and electrically connecting said member and the surface of said aircraft, having a relatively high impedance with respect to an equal length of said member.

10. In combination with an aircraft, means for eliminating static charges which collect on the surface thereof, said means comprising a conducting member extending substantially parallel to the longitudinal axis of the aircraft and rearwardly of said aircraft during flight, the diameter of the member being extremely small as compared to the length thereof, and a continuously conductive current controlling element interposed between and electrically connecting said member and the surface of said aircraft and having a relatively high opposition to high frequency current flow with respect to an equal length of said member.

11. In combination with an aircraft having a conducting surface, means for discharging accumulated static electricity from said conducting surface under control, said means comprising a trailing wire of fine gauge and of substantial length extending longitudinally toward the rear of the plane and disposed substantially parallel to the longitudinal axis of the plane when the plane is in flight, and a continuously conductve static discharge controlling element interposed between and electrically connecting said member and said conducting surface, said element damping out the flow of noise producing high frequency currents between said conducting surface and said wire.

12. Means for reducing static interference with radio reception on an aircraft, caused by discharge of the static electricity which collects on the conducting surface of the craft during flight comprising the combination with the conducting surface of an aircraft, of a relatively long wire of fine gauge trailed behind the craft in flight for discharging a flow of static electricity, and a continuously conductive static discharge controlling element interposed between said metal surface and said trailing wire for limiting the pulsations and oscillations in the flow of static electricity discharged from said conductive surface by said trailing wire.

13. Means for reducing static interference with radio reception on an aircraft, caused by uncontrolled discharge of the static electricity which is collected on the conducting surface of the craft during flight comprising the combination with the conducting surface of an aircraft of a static discharge wire of fine gauge extending toward the rear of the plane during flight, and a high frequency suppressor connected conductively in series between said discharge wire and said conducting surface of the plane.

14. The combination of claim 13 wherein the high frequency suppressor comprises a relatively high resistance with respect to an equal length of said discharge wire.

ROSCOE H. GEORGE.